(12) United States Patent
Matthews et al.

(10) Patent No.: US 6,647,838 B2
(45) Date of Patent: Nov. 18, 2003

(54) COUPLER TOOL

(75) Inventors: John H. Matthews, Cummings; Roy A. Miller, Jonesboro, both of GA (US)

(73) Assignee: The Lubrizol Corporation, Wickliffe, OH (US)

( * ) Notice: Subject to any disclaimer, the term of this patent is extended or adjusted under 35 U.S.C. 154(b) by 20 days.

(21) Appl. No.: 09/844,460

(22) Filed: Apr. 27, 2001

(65) Prior Publication Data

US 2002/0157508 A1 Oct. 31, 2002

(51) Int. Cl.$^7$ .................................................. B67B 7/14
(52) U.S. Cl. ............................................. 81/488; 81/3.4
(58) Field of Search ................................... 81/488, 3.4

(56) References Cited

U.S. PATENT DOCUMENTS

| | | | |
|---|---|---|---|
| 2,038,116 A | | 4/1936 | Kliment |
| 2,956,461 A | | 10/1960 | Anderson |
| 3,280,662 A | * | 10/1966 | Frankenfield ................. 81/448 |
| 4,788,894 A | * | 12/1988 | Mitschele ..................... 81/488 |
| 5,203,240 A | | 4/1993 | Sorter |
| 5,275,086 A | | 1/1994 | Stallings, Jr. |
| 5,407,175 A | | 4/1995 | Roberts et al. |
| 5,628,344 A | | 5/1997 | Roberts |
| 6,044,732 A | | 4/2000 | Astle |

* cited by examiner

Primary Examiner—James G. Smith
Assistant Examiner—Hadi Shakeri
(74) Attorney, Agent, or Firm—Teresan W. Gilbert; Michael F. Esposito

(57) ABSTRACT

The coupler tool of the present invention includes a ring having oppositely facing radial flat parallel sides and radial outer edges beveled toward one another. Extending axially outwardly from one of the sides is a handle portion. The handle portion includes a pair of laterally spaced apart arms extending axially outwardly from diametrically opposite areas of one side of the ring and a hand grip extending between the arms in axially spaced relation from such one side.

16 Claims, 3 Drawing Sheets

COUPLER TOOL

FIELD OF THE INVENTION

This invention relates to a coupler tool for use in manually opening an API standard dry break coupler used in the loading of gasoline or other fuels from fuel loading equipment into fuel transport trucks and the like.

BACKGROUND OF THE INVENTION

Fuel tanker trucks are typically loaded with fuel at bulk terminals by attaching an API standard dry break coupler on the end of a flexible fuel transfer hose to a mating adapter on the tanker truck to permit the flow of fuel to the tanker truck. For safety and leak-free operation, such couplers are designed with suitable internal mechanisms to insure proper alignment and connections with the mating tanker truck adapters when coupled before the couplers can be opened by the operator.

A typical bulk loading terminal may have ten to twelve couplers in use. Some larger terminals may have as many as thirty or more couplers in use. These couplers require maintenance due to constant use. When servicing and repairing the couplers and associated fuel loading equipment, it becomes necessary to open the couplers to drain the fuel from the equipment. Heretofore this was accomplished by hand, which was made difficult because of the multiple internal mechanisms of the couplers that insure safe and leak-free operation. Thus there is a need for a coupler tool that enables a single operator to manually open such couplers with ease to drain the fuel from the fuel loading equipment prior to servicing and repairing of the couplers and associated fuel loading equipment.

SUMMARY OF THE INVENTION

The present invention relates to a coupler tool that enables a single operator to manually open API standard dry break couplers to drain the fuel from the fuel loading equipment to enable servicing and repair of the couplers and associated fuel loading equipment.

In accordance with one aspect of the invention, the coupler tool comprises a ring machined or molded to simulate a mating tanker truck adapter and a handle portion that allows for easy insertion of the ring into and removal from the coupler.

In accordance with another aspect of the invention, the coupler tool ring when inserted into the coupler engages the internal mechanisms allowing the coupler to be opened without the use of the mating adapter.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
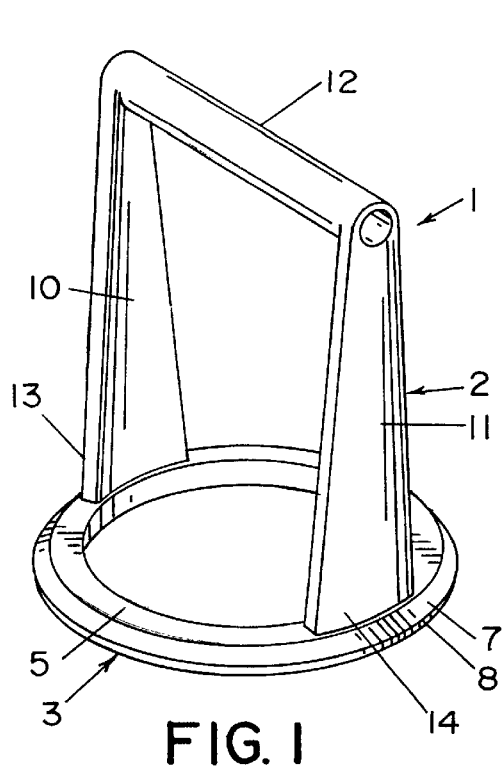
FIG. 1 is a perspective view of a coupler tool embodiment in accordance with the present invention.
Figure 2:
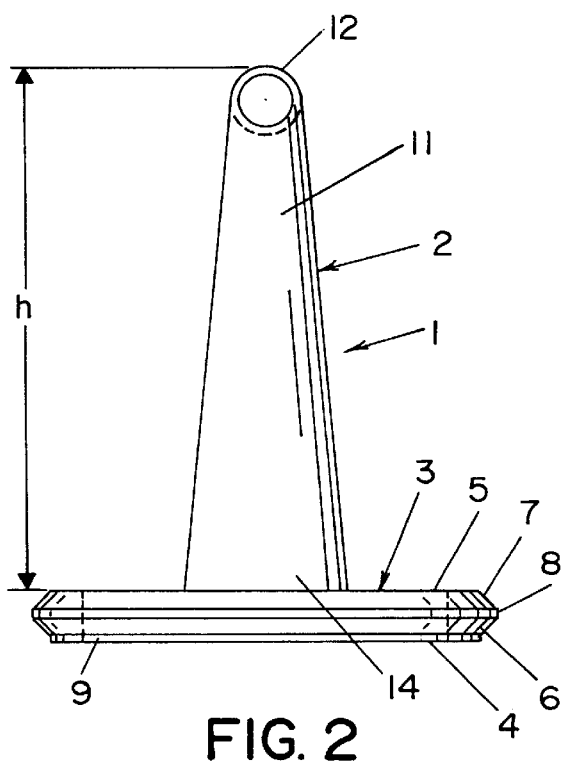
FIG. 2 is a side elevation view of the coupler tool of FIG. 1.
Figure 3:
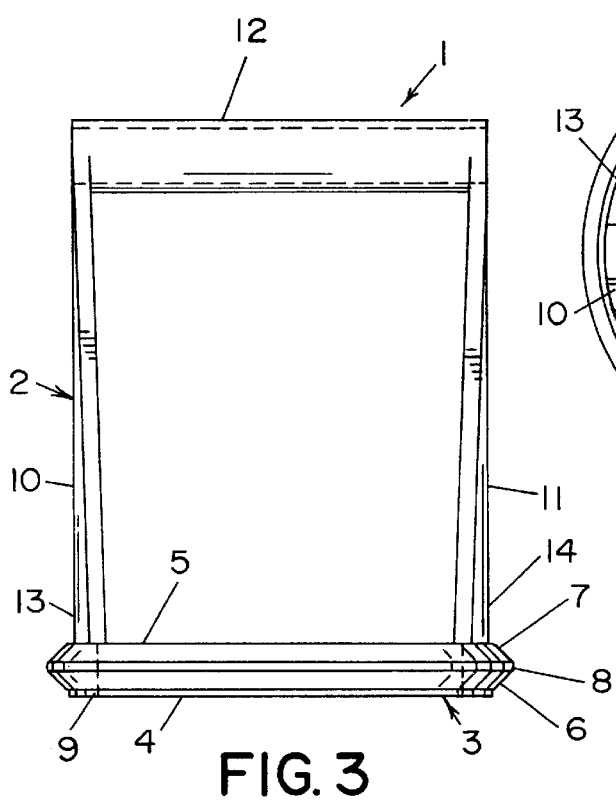
FIG. 3 is a front elevation view of the coupler tool.
Figure 4:
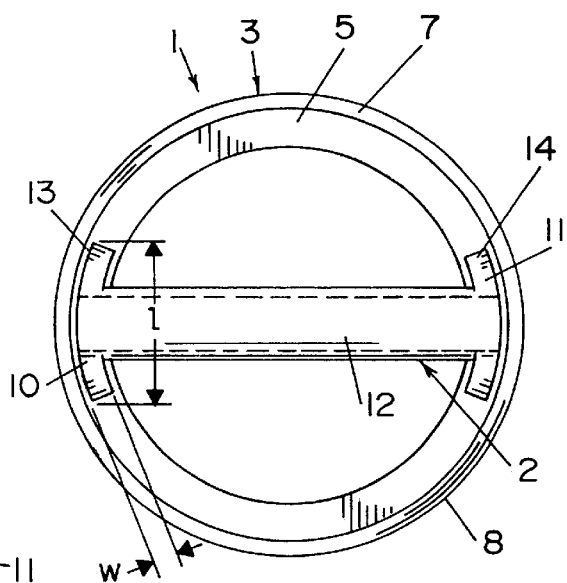
FIG. 4 is a top plan view of the coupler tool.

Referring now in the detail to the drawings, FIGS. 1–5 show a coupler tool 1 embodiment according to the invention, which comprises a handle 2 and coupler mating ring 3 fabricated or cast of a suitable material compatible with petroleum fuels. Ring 3 is shaped to simulate a mating API standard adapter on a tanker truck and has oppositely facing radial flat parallel sides 4, 5 and radial outer edges 6, 7 beveled toward each other at a 45° angle. These outer edges 6, 7 terminate short of each other, leaving a relatively narrow cylindrical surface 8 therebetween. The outer flat side 4 of ring 3 also has a relatively narrow cylindrical outer wall 9 protruding axially outwardly of the radial innermost end of the outer edge 6 (see FIG. 5).

Figure 5:
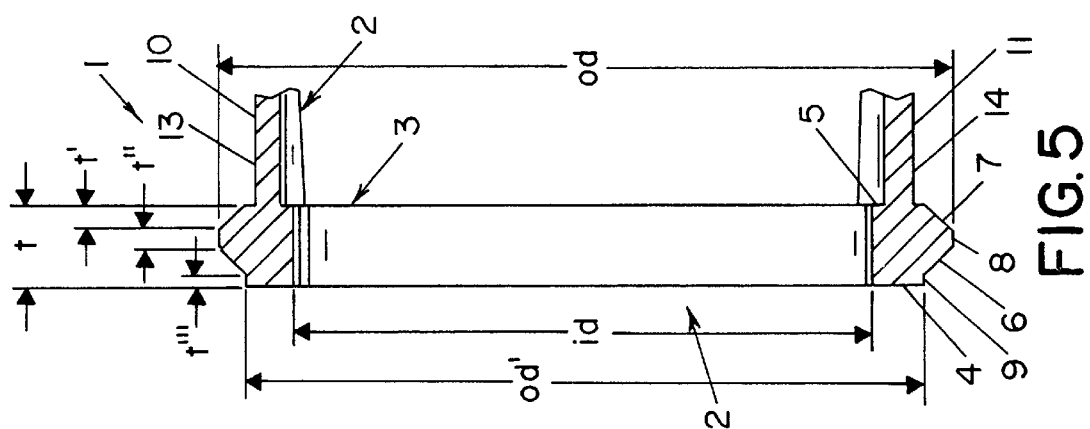
FIG. 5 is an enlarged fragmentary cross section through the coupler tool ring.

Although the dimensions of the ring 3 may vary depending on the dimensions of the couplers with which it is intended to be used, in the embodiment disclosed herein, the ring 3 has an inner diameter id of 5.125 inches and an outer diameter od of 6.5 inches; the sides 4, 5 and cylindrical outer wall 9 have an outer diameter od' of 6 inches; the ring 3 has an overall thickness t of 0.6875 inch; the two beveled outer edges 6, 7 each have a thickness t' of 0.250 inch; the cylindrical intermediate surface 8 has a thickness t" of 0.125 inch; and the cylindrical outer wall 9 has a thickness t''' of 0.0625 inch (see FIG. 5).

The handle 2 has a pair of laterally spaced apart arms 10, 11 extending axially outwardly from diametrically opposite areas of the inner flat side 5 of ring 3 and a hand grip 12 extending between the outer ends of the arms. The inner ends of the arms 10, 11 have arcuate shaped bases 13, 14 (see FIG. 4) that substantially match the curvature of the inner flat side 5 of the ring 3 so as not to protrude radially outwardly beyond the radial innermost end of the associated outer edge 7. The bases 13, 14 of the handle arms 10, 11 each have a length 1, for example, of 2.250 inches and a width w somewhat less than the 0.4375 inch radial width of the inner flat side 5 of the ring. Also, both arms 10, 11 may have an overall length h, for example, of 7.3125 inches (see FIG. 2).

Figure 6:
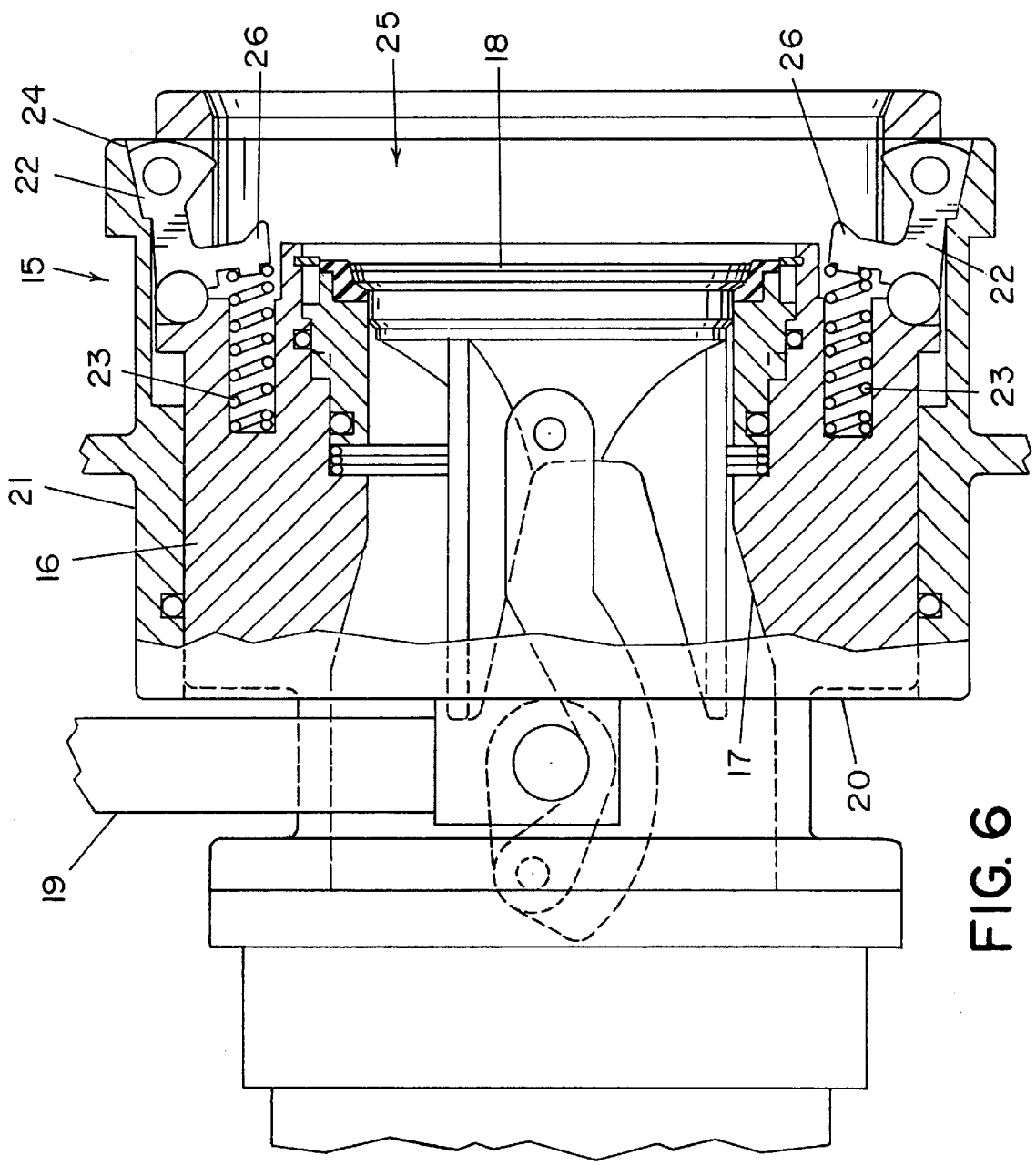
FIG. 6 is a schematic enlarged fragmentary longitudinal section through an API standard dry break coupler with coupler sleeve shown fully retracted preventing the coupler valve from being opened.

Such a coupler tool 1 may be used to manually open an API standard dry break loading coupler 15 such as shown in FIG. 6, which includes a cylindrical body 16 having a flow passage 17 therethrough. Mounted within flow passage 17 is a poppet valve 18 that is axially movable between opened and closed positions by rotating a lever 19 pivotally mounted on the body. Lever 19 is prevented from rotating the poppet valve 18 to the open position by a stop 20 on a coupler sleeve 21 when the coupler sleeve is in its fully retracted position shown in FIG. 6. Pivotally mounted latching lugs 22 on the body 16 are biased radially outwardly by springs 23 into a counterbore 24 in the axial outer end of the coupler sleeve 21, preventing the coupler sleeve from being moved forward.

Figure 7:
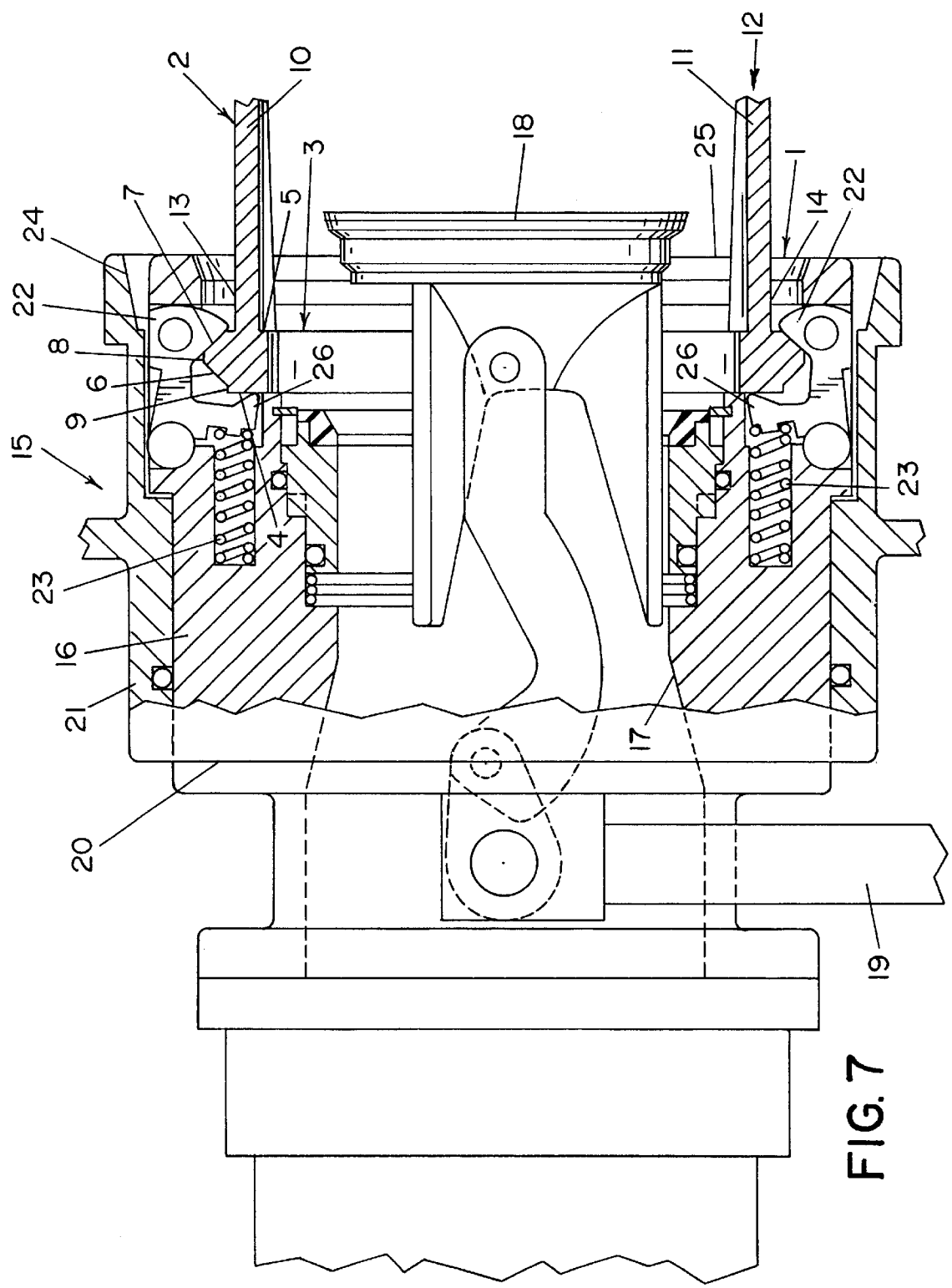
FIG. 7 is a schematic enlarged fragmentary longitudinal section of the coupler of FIG. 6 but with the coupler tool of the present invention inserted into the open end of the coupler, and the coupler sleeve moved to its forwardmost position locking the coupler tool in place, and the coupler valve moved to the open position.

The coupler tool 1 may be used to manually open coupler 15 to drain the fuel from the associated fuel loading equipment (not shown) to enable servicing and repairing the coupler and associated fuel loading equipment by grasping the hand grip 12 of the coupler tool with one hand and inserting the coupler tool ring 3 into the open end 25 of the coupler. Continued inward movement of the ring 3 into engagement with the radial arms 26 of the latching lugs 22 causes the latching lugs 22 to pivot inwardly, compressing the latching lug springs 23 and moving the latching lugs out of engagement with the coupler sleeve 21 and into mating engagement with the outer beveled side edge 7 of the ring 3 as schematically shown in FIG. 7. With the latching lugs 22 pivoted inwardly, the coupler sleeve 21 is free to be moved forward into overlying engagement with the latching lugs as schematically shown in FIG. 7, locking the tool 1 in place within the coupler 15.

Once the coupler tool 1 is locked in place, the coupler lever 19 is free to be rotated counterclockwise as seen in FIG. 7 to cause the coupler valve 18 to move to the fully open position shown in FIG. 7 extending axially through the ring 3 radially inwardly of the handle arms 10, 11. When the associated fuel loading equipment is completely drained, the coupler tool 1 cannot be removed from the coupler until the coupler lever 19 is rotated in the reverse direction to close the coupler valve 18 and the coupler sleeve 21 is moved back to the position shown in FIG. 6, permitting the latching lugs 22 to pivot out of engagement with the tool ring 3 as the coupler tool 1 is withdrawn from the coupler.

Although the invention has been shown and described with respect to a certain embodiment, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiment of the invention. In addition, while a particular feature of the invention may have been disclosed with respect to only one embodiment, such feature may be combined with one or more other features of other embodiments as may be desired and advantageous for any given or particular application.

What is claimed is:

1. A tool for use in manually opening a coupler used for loading of fuel into fuel transport trucks comprising a ring having two oppositely facing radial sides and radial outer edges beveled toward one another, and a handle extending axially away from one of said sides for grasping by an operator, said handle including a pair of laterally spaced arms having inner ends connected to said one side of said ring radially inwardly of the outer edge of said one side, and a hand grip extending between said arms axially spaced from said one side of said ring.

2. The tool of claim 1 wherein said inner ends of said arms have arcuate radial outer surfaces of a radius no greater than an inner radius of the outer edge of said one side of said ring.

3. The tool of claim 2 wherein said inner ends of said arms have radial inner surfaces of a radius no less than an inner radius of said one side of said ring.

4. The tool of claim 1 wherein the other side of said ring has a cylindrical outer wall extending axially outwardly from a radial innermost end of the outer edge of said other side.

5. The tool of claim 1 wherein said outer edges have a 45° taper.

6. The tool of claim 1 wherein said oppositely facing sides of said ring are flat and parallel to one another.

7. A coupler tool comprising a ring having two oppositely facing radially extending flat parallel sides and outer edges beveled toward one another, and a U-shaped handle having a pair of spaced apart arms extending axially away from diametrically opposite areas of one of said sides and a hand grip extending between axial outer ends of said arms.

8. The tool of claim 7 wherein said arms have bases at inner ends thereof connected to said diametrically opposite areas of said one side of said ring, said bases having curved radial outer surfaces so as not to protrude radially outwardly of an innermost end of said outer edge.

9. The tool of claim 7 wherein said outer edges are beveled at 45° toward one another.

10. The tool of claim 7 wherein said outer edges have axially spaced apart outer ends joined together by a cylindrical surface.

11. The tool of claim 10 wherein said cylindrical surface has an axial thickness of 0.125 inch and said outer edges each have an axial thickness of 0.250 inch.

12. The tool of claim 7 wherein said ring has an inner diameter of 5.125 inches and an outer diameter of 6.5 inches.

13. The tool of claim 12 wherein said sides have an outer diameter of 6 inches.

14. The tool of claim 7 wherein said oppositely facing sides intersect said outer edges at a diameter of 6 inches.

15. The tool of claim 7 wherein the other side of said ring has a cylindrical outer wall protruding axially outwardly from an innermost end of the outer edge of said other side.

16. The tool of claim 15 wherein said cylindrical wall has an axial thickness of 0.0625 inch.

\* \* \* \* \*